(12) United States Patent
Austenfeld et al.

(10) Patent No.: US 12,195,862 B2
(45) Date of Patent: Jan. 14, 2025

(54) USE OF A TEXTILE, ZERO-GAP ELECTROLYTIC CELL AND PRODUCTION METHOD THEREFOR

(71) Applicant: THYSSENKRUPP NUCERA AG & CO. KGAA, Dortmund (DE)

(72) Inventors: Sebastian Austenfeld, Soest (DE); Michael Wagner, Wuppertal (DE); Peter Toros, Essen (DE); Peter Woltering, Neuenkirchen (DE)

(73) Assignee: THYSSENKRUPP NUCERA AG & CO. KGAA, Dortmund (DE)

( * ) Notice: Subject to any disclaimer, the term of this patent is extended or adjusted under 35 U.S.C. 154(b) by 421 days.

(21) Appl. No.: 17/782,892

(22) PCT Filed: Nov. 23, 2020

(86) PCT No.: PCT/EP2020/083065
§ 371 (c)(1),
(2) Date: Jun. 6, 2022

(87) PCT Pub. No.: WO2021/110457
PCT Pub. Date: Jun. 10, 2021

(65) Prior Publication Data
US 2023/0020215 A1 Jan. 19, 2023

(30) Foreign Application Priority Data
Dec. 6, 2019 (DE) .................... 10 2019 219 027.8

(51) Int. Cl.
*C25B 13/05* (2021.01)
*C25B 1/04* (2021.01)
(Continued)

(52) U.S. Cl.
CPC ............... *C25B 13/05* (2021.01); *C25B 1/04* (2013.01); *C25B 9/21* (2021.01); *C25B 9/63* (2021.01); *C25B 9/65* (2021.01); *C25B 13/02* (2013.01)

(58) Field of Classification Search
CPC ............ C25B 13/02; C25B 9/65; H01M 4/64; H01M 4/747
See application file for complete search history.

(56) References Cited

U.S. PATENT DOCUMENTS 4,210,512 A 7/1980 Lawrance et al.
4,608,144 A 8/1986 Darwent
(Continued)

FOREIGN PATENT DOCUMENTS

EP 1 882 758 A1 1/2008
EP 2 165 008 A2 3/2010
(Continued)

OTHER PUBLICATIONS

English Translation of International Search Report issued in PCT/EP2020/083065, dated Jan. 20, 2021.

*Primary Examiner* — Brian W Cohen
(74) *Attorney, Agent, or Firm* — thyssenkrupp North America, LLC

(57) ABSTRACT

A textile can be configured as a spacer between a housing or a supporting structure and an electrode or a substructure of an electrode of a zero-gap electrolytic cell. The textile may comprise a mechanical connection means composed of an elastic polymeric material and may comprise an electrical connection means different from the mechanical connection means. A zero-gap electrolytic cell can be furnished with such a textile. Further, a method for producing such a zero-gap electrolytic cell may be characterized in that at least one ply of a textile is placed into an anode tank or cathode tank, an anode or cathode electrode is disposed on (Continued)

the at least one ply of the textile, an ion exchange membrane is placed onto this electrode, and a cathode electrode or anode electrode connected to a cathode tank or anode tank, respectively, is disposed on the ion exchange membrane.

11 Claims, 5 Drawing Sheets

(51) Int. Cl.
*C25B 9/21* (2021.01)
*C25B 9/63* (2021.01)
*C25B 9/65* (2021.01)
*C25B 13/02* (2006.01)

(56) References Cited

U.S. PATENT DOCUMENTS

| | | | |
|---|---|---|---|
| 4,693,797 A * | 9/1987 | deNora | ............. C25B 9/65 204/266 |
| 8,197,649 B2 | 6/2012 | Saiki et al. | |
| 8,372,255 B2 | 2/2013 | Perego et al. | |
| 9,404,191 B2 | 8/2016 | Hara et al. | |
| 2002/0144898 A1 | 10/2002 | Laconti et al. | |
| 2004/0188245 A1 | 9/2004 | Katayama et al. | |
| 2006/0011489 A1 | 1/2006 | Swanepoel et al. | |
| 2010/0108537 A1 | 5/2010 | Perego et al. | |
| 2012/0125782 A1 | 5/2012 | Asaumi et al. | |
| 2016/0164120 A1 | 6/2016 | Swiegers et al. | |
| 2017/0191175 A1 | 7/2017 | Hahn et al. | |

FOREIGN PATENT DOCUMENTS

| | | |
|---|---|---|
| EP | 2 436 804 A1 | 4/2012 |
| EP | 2 957 659 A1 | 12/2015 |
| EP | 3 173 509 A | 5/2017 |
| JP | 2016-533006 A | 10/2016 |
| JP | 2017-526808 A | 9/2017 |
| KG | 786 C1 | 6/2005 |
| KR | 1020150104216 A | 9/2015 |
| RU | 2005105559 A | 10/2005 |
| WO | 2019 175199 A1 | 9/2019 |

* cited by examiner

USE OF A TEXTILE, ZERO-GAP ELECTROLYTIC CELL AND PRODUCTION METHOD THEREFOR

CROSS REFERENCE TO RELATED APPLICATIONS

This application is a U.S. National Stage Entry of International Patent Application Serial Number PCT/EP2020/083065, filed Nov. 23, 2020, which claims priority to German Patent Application No. DE 10 2019 219 027.8, filed Dec. 6, 2019, the entire contents of both of which are incorporated herein by reference.

FIELD

The present disclosure generally relates to electrolysis, including methods of using a textile as a spacer between a housing and an electrode of a zero-gap electrolytic cell.

BACKGROUND

The electrolysis of water to give oxygen and so-called "green" hydrogen, in times of heightened environmental awareness and ambitious objectives in terms of CO2 savings ("energy transition"), represents a promising technology for production of a CO2-free energy source using renewable energies, such as wind, hydro and solar energy. This "green" hydrogen can be used, for example, as an energy store, as a fuel for vehicles, or for production of chemicals. At the heart of a "green" hydrogen production plant based on electrolysis of water, as in the case of the electrolytic production of chlorine and sodium hydroxide (chlor-alkali electrolysis), is the electrolytic cell. This is one of the reasons for the continual ongoing development of the electrolysis technology with the aim, for example, of optimizing the efficiency.

Electrolytic cells operating with the membrane technology feature a cathode chamber and an anode chamber containing the respective electrodes and an electrolyte, with the electrodes disposed at a distance from an ion-selective membrane that separates the two electrodes. It has emerged, however, that this cell design is suboptimal in terms of the efficiencies achieved.

A particularly energy-efficient electrolytic cell which has been disclosed, therefore, is that known as the "zero-gap electrolytic cell" (see U.S. Pat. No. 9,404,191 B2 or EP 2 436 804 A1). In this cell the cathode and anode—as indicated by the term "zero-gap"—are separated only by the membrane, and so both anode and cathode lie contactingly against the membrane. This lowers the cell resistance, with a significant accompanying energy saving. It also results in the membrane life being extended.

In a zero-gap electrolytic cell it is usual for an elastic element, as it is known, to be disposed between a rear housing wall, also referred to as the tank, and the electrode to be pressed flatly and uniformly against the membrane. Said elastic element may be formed by a metallic coil, manufactured for example of nickel, or by a fine-mesh net of finely woven nickel threads, which on account of their special structure act like a spring, said element being clamped between electrode and rear housing wall and so ensuring the required homogeneous and well-gauged surface pressing of the electrode against the membrane. At the same time the known elastic element has the function of taking off the current from the electrode to the rear housing wall.

As well as the elastic element, a zero-gap electrolytic cell of this kind generally possesses, on the cathode side, internals (e.g., linear fins) welded to the housing, and a supporting structure for the elastic element (e.g., expanded metals), which are used for mechanical fixing of the cathode electrode.

Adverse features of the existing zero-gap electrolytic cells, resulting from the elastic element being formed of nickel, have proven to be a not inconsiderable level of consumption of nickel material, and also a high level of cost and complexity for welding or production, for the purpose of fixing the cathode electrode.

On the basis of this above-discussed prior art, therefore, the object for the invention is that of providing reliable mechanical fixing and electrical contacting of the active electrode in conjunction with reduced cost and complexity of assembly and materials.

US 2017/0191175A1 discloses a gas diffusion layer for an electrolytic cell, with a spring component consisting of a spiral braid. The spiral braid consists of transverse rods arranged in succession and around which are wound a multiplicity of spirals. The spiral braid is formed when spirals with the same geometry but different winding direction are inserted in alternation one inside another and are connected by the transverse rods. The transverse rods are manufactured of plastic material, for example. The spirals consist of an electrically conductive material such as, for example, stainless steel, titanium, niobium, tantalum or nickel.

WO 2019/175199A1 describes a gas distributor structure for a fuel cell, with a woven fabric comprising at least two kinds of fibers, these being base fibers for producing a base structure of the fabric, and functional fibers for assisting conduction of electrical current between a bipolar plate and an electrode assembly, and also for supporting the accommodation of mechanical force between the bipolar plate and the electrode assembly.

Thus a need exists for methods of using a textile as a spacer between electrode and housing of the electrolytic cell, the textile comprising a mechanical connection means composed of an elastic polymeric material and comprising an electrical connection means different from the mechanical connection means.

DETAILED DESCRIPTION

Figure 1:
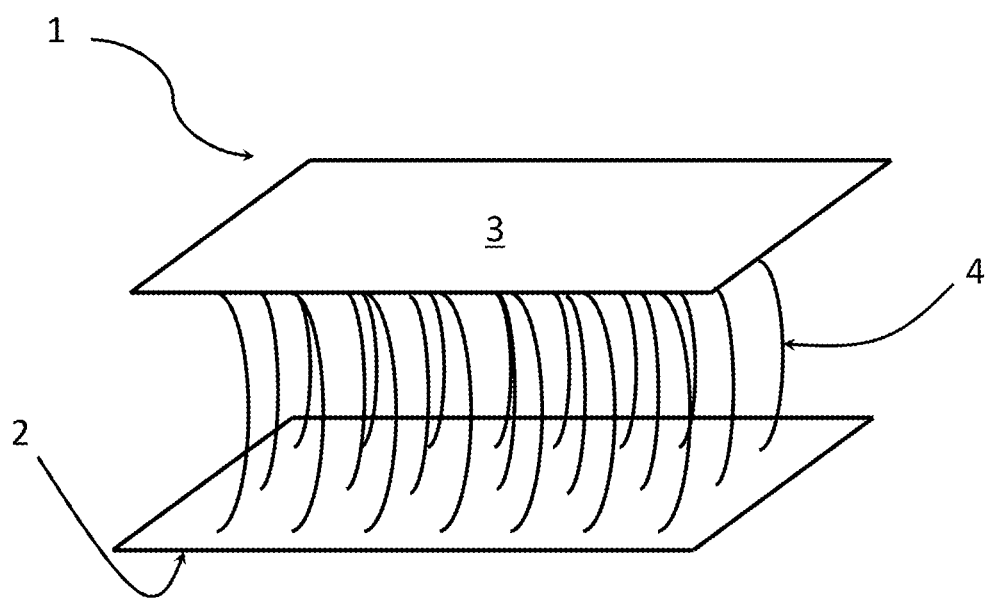
FIG. 1 is a schematic perspective side view of a textile in an unloaded state (omitting electrical connection means).

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods of using a textile as a spacer between a housing or supporting structure and an electrode or the substructure of an electrode of a zero-gap electrolytic cell. The present disclosure further relates not only to zero-gap electrolytic cells furnished with such a textile, but also to methods for producing such a zero-gap electrolytic cell.

The textile used in the invention has a mechanical and an electrical connection means for connecting or contacting the rear housing wall with the electrode. The mechanical connection means here is used for clamping between one electrode and the rear housing wall in order to press the electrode against the membrane. This requires that the textile is elastically deformable and also is chemically resistant to the medium prevailing in the electrolytic cell. In order to meet these requirements, the mechanical connection means is manufactured of an elastic polymeric material, such as PTFE, PFA or PP, for example. The mechanically relevant property of the elastic polymeric material is its modulus of elasticity, which enables compression of the textile on installation and maintains an extremely uniform contact pressure of the electrode against the membrane in the installed state. To press the electrode against the membrane, therefore, the invention utilizes an elastic deformability of the textile, without that textile undergoing any significant plastic deformation.

The requirement regarding the electrical connection means of the textile is that an electrical contact between electrode and rear housing wall is ensured, in order to be able to take off the current which flows during electrolysis. To provide the electrical conductivity, the electrical connection means will as a general rule have a metallic embodiment. Manufacture of the metallic connection means from graphite is likewise possible.

A key advantage of using the textile of the invention for connection between a housing and an electrode of a zero-gap electrolytic cell is that the elastic element necessary in the prior art is replaced by the textile used in the invention, with the mechanical function, the pressing of the electrode against the membrane, being decoupled from the electrical function, the contacting of the active electrode. This decoupling not only does away with the use of an excessive and costly deployment of nickel but also removes the need for welded components used for supporting the active electrode. As a result of this simplified design and as a result of the provision of the invention, it is possible to reduce not only the costs of materials but also the cost and complexity of production of a zero-gap electrolytic cell. Furthermore, the use of the textile in accordance with the invention allows a significantly greater distance to be bridged for the same elastic properties of the textile or elastic element. This does away with the need for the costly substructure of a nickel supporting structure.

The mechanical connection means of the present disclosure may have a top fabric and bottom fabric made of filaments and also has a multiplicity of pile threads connecting the top and bottom fabrics. The top and bottom fabrics and also the pile threads here form a mattress-like structure which, for the purpose of maximizing the membrane lifetime, enables an extremely uniform distribution of the contact pressure in that pressure is exerted on the bottom fabric, the mattress-like structure is compressed, and the top fabric in turn presses the electrode against the membrane. From the other side of the membrane, the membrane is contacted by a second electrode, anode or cathode, and so the arrangement described results in a zero-gap electrolytic cell. In one preferred embodiment of the textile of the present disclosure the mechanical connection element is formed of a woven polymeric fabric, consisting of polymeric filaments, and has woven top and bottom fabrics.

The polymeric filaments advantageously have a diameter of 0.1-0.5 mm. This range represents an effective tradeoff between mechanical properties, a sufficient flow permeability of the overall woven fabric with not too small a distance between the individual polymeric filaments, and the market availability.

In a development of this preferred development of the textile of the invention, the electrical connection element is formed by metal wires passing through the top and bottom fabrics. The reason for causing the metal wires to pierce the top and bottom fabrics is that this is the only way in which electrical contact can be achieved between an electrode on the top fabric and a rear housing wall on the bottom fabric. If the metal wires only ran between the insides of the top and bottom fabrics, the desired electrical contact would not be there.

Where two or more plies of the textile are to be disposed one above another, as may be advantageous on manufacturing grounds—if, for example, the only machine available is able to produce a textile having a certain maximum height or if the textile beyond a certain height fails to generate a sufficient restoring force on deformation—then the distribution of the metal wires piercing the top and bottom fabrics, and more particularly the course of these wires on the outer sides—that is, the sides facing the electrode or rear housing wall, respectively—should be selected such that when two or more textiles are laid one atop another a multiplicity of electrically contacting crossover points of the metal wires of adjacent plies are formed. An additional reason for the provision of two or more plies of the textile used in the invention may be that of compensating anisotropic properties of the textile on deformation. If the textile moves in one direction under load, this can be compensated by turning an overlying ply by 180°. This effectively prevents a lateral shifting at the surface. In an alternative development of the invention, the metal wires pass through a plurality of plies of overlaid textiles, to be able to ensure electrical contact between multiple plies.

It has further been found to be particularly advantageous if the metal wires, more particularly nickel wires, running between the two insides of a mattress-like structure have a stretched length which is greater than the height of the mattress-like structure.

The resultant bulky course of the metal wires produces reliable electrical contacting, without detracting from the mechanical deformability of the textile. In interaction with the above-described mattress-like structure and with the elastic properties of the polymeric filaments, the compression of the mattress-like structure may even occur up to the blocking ply of the top and bottom fabrics, without the metal wires or the polymeric filaments suffering damage, particularly as a result of plastic deformation.

With regard to the possibly desired predetermination of the direction of deformation under load, moreover, it may be advantageous to use a textile wherein the metal wires in the resting position are at a smaller distance than the spacing of the mattress-like structure.

The entire conduction cross section over the area of the electrolytic cell is advantageously selected to be sized such that there is no significant drop in voltage as a result of the electrical connection means. For active electrode area of 1 m² a conduction cross section of 350-2100 mm² has emerged as being suitable.

More preferably the metal wires possess a diameter of 0.05-0.3 mm. This has emerged has being an effective tradeoff between as small a voltage drop as possible, high elastic deformability, and capacity for the wires to be processed in customary textile machines.

As an alternative to the above-described preferred embodiment wherein the electrical connection means are metal wires passing through the top and bottom fabrics, the electrical connection means may be realized by an electrically conductive coating of the pile threads. The pile threads may be coated either before or after the operation of producing the mattress-like structure. Care should be taken, however, to ensure that the mechanical properties of the pile threads are not adversely affected by the metallic coating, especially its thickness.

In both of the embodiments described, the top and bottom fabrics possess electrically conductive contact points, thereby effectively fulfilling their function as electrical connection means, as a result, externally, of metal wires which are pierced through them and woven into them and/or by means, externally, of the coated pile threads incorporated into the top and bottom fabrics.

As well as the use of a textile in accordance with the invention, the invention also relates to a zero-gap electrolytic cell comprising an anode electrode, a cathode electrode, an ion exchange membrane disposed between an anode electrode and cathode electrode, and a housing formed of an anode tank and a cathode tank, there being, disposed between at least one of the electrodes and one of the tanks, at least one ply of a textile of the invention contacting the respective electrode and the respective tank. One reason in favor of the textile of the invention being disposed on the cathode side is that nickel is regularly employed as the metallic cathode material and the conduction of the operating current can therefore be accomplished via a pure physical contacting. Nickel is stable in the operating environment and possesses a good electrical conductivity. There are also a multiplicity of plastics which are chemically stable in the operating medium of the cathode, an example being polyphenylene sulfide, whereas on the anode side, for example, in the case of chloralkali electrolysis, chlorine gas is formed, which severely limits the materials which can be used.

The invention additionally relates to a method for producing a zero-gap electrolytic cell of the invention, where at least one ply of a textile of the invention is placed into the anode tank or the cathode tank, an anode electrode or cathode electrode is disposed on the at least one ply of the textile, an ion exchange membrane is placed onto this electrode, and a cathode electrode or anode electrode connected to a cathode tank or anode tank, respectively, is disposed on the ion exchange membrane.

A feature of the method of the invention is that it enables the production of a zero-gap electrolytic cell with the textile of the invention in a particularly simple and cost-effective way.

In order to ensure the electrical contacting of the electrode and rear housing wall by the textile of the invention, it is particularly preferable with this production method for the textile to be introduced with a contact pressure—as a form of precompression, so to speak—between electrode and tank. In this case a contact pressure of about 100-150 mbar has emerged as being particularly suitable. With this pressure it is anticipated that the physical contact between the conductive components of the top and bottom fabrics and the connected components, rear housing wall and electrode, is able to transmit current sufficiently, hence that there is no excessive drop in voltage.

The use of a textile 1 for connection between a housing and an electrode of a zero-gap electrolytic cell is shown illustratively in FIG. 1 in the unloaded state. The mechanical connection means exclusively is pictured here, whereas the electrical connection means is not shown, for reasons of clarity. The textile 1 used in the invention comprises top and bottom fabrics 2, 3 woven from filaments, and also pile threads 4 connecting the top and bottom fabrics 2, 3. The top and bottom fabrics 2, 3 have a planar design running parallel to one another, because, in their installed state between electrode and rear housing wall of an electrolytic half-cell, they serve for the extremely uniform transmission of a force which acts on the rear housing wall and which is directed into the interior of the electrolytic cell. If the rear housing wall is subjected to a force toward the interior of the electrolytic cell, the bottom fabric 2 carries out transmission—mediated via the pile threads 4—of the force to the top fabric 3 which contacts one electrode. In order to reduce the directional dependence of the deformation, it is also possible to use a textile wherein the mechanical connection means cross one another, so that there is no preferential mechanical direction.

Figure 2:
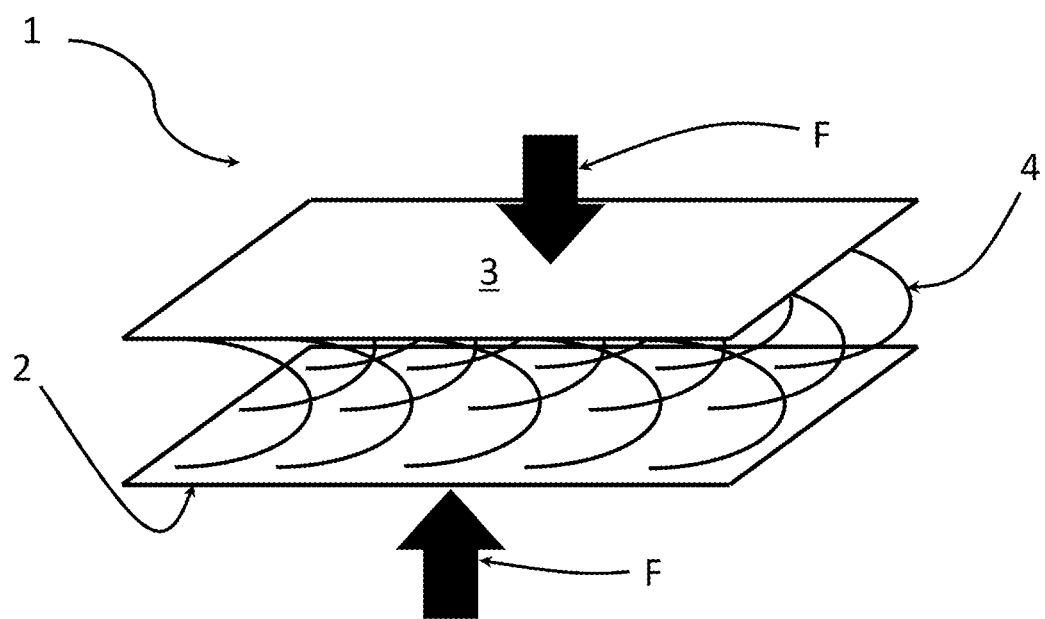
FIG. 2 is a schematic perspective side view of the textile of FIG. 1 in a loaded state.

This transmission of force is reproduced schematically in FIG. 2, which shows a loaded textile. The lower force arrow here corresponds to a rear housing wall acting with the force F on the bottom fabric 2, the wall not being shown. Mediated via the pile threads 4, which are elastically deformed as a result of exposure to the force, the force F is transmitted to the top fabric 3, which passes on the force F to an electrode which is likewise not shown but which contacts the top fabric 3, in order to press the electrode uniformly and therefore particularly gently against the membrane and/or to maintain the electrode in position without using additional components, especially welded metal plates or expanded metals. In this context it has proven particularly advantageous that the mechanical connection means consists of an elastic polymeric material, polymeric filaments in the present case, since this allows plastic deformations to be effectively prevented, and the lifetime of the textile of the invention is therefore not adversely effected by exposure to the force F.

Figure 3:
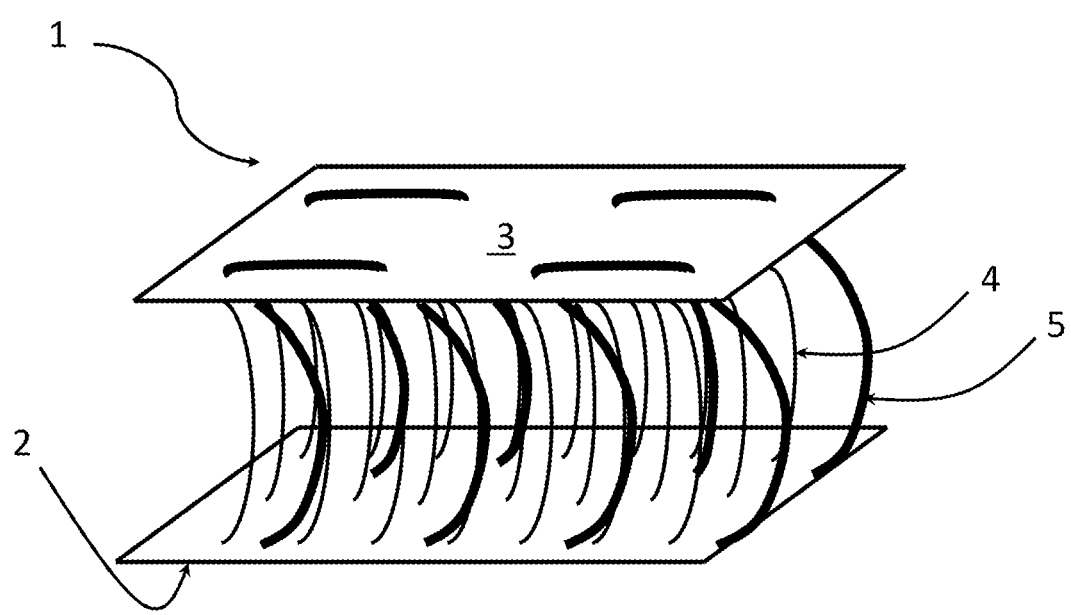
FIG. 3 is a schematic perspective side view of the textile of FIG. 1, with example mechanical and electrical connection means.

FIG. 3, which relates to the same exemplary embodiment as FIG. 1, illustrates not only the mechanical connection means, which is shown in FIG. 1 and FIG. 2 for different states of loading, but also the electrical connection means. In this exemplary embodiment the electrical connection means is realized by metal wires 5 which pass through the top and bottom fabrics 2, 3. It is apparent here that a metal wire 5 extending from the bottom fabric 2 pierces through the downward-facing side of the top fabric 3 and runs substantially parallel to the plane of the top fabric 3, on the upward-facing side of the top fabric 3, before passing again through the upward-facing side of the top fabric 3, and then being passed, similarly, through the bottom fabric 2 as well. In this way, the downward-facing side of the bottom fabric 2 and also the upward-facing side of the top fabric 3 are provided with metal wire 5, thereby producing a reliable electrically conductive connection for contacting the rear housing wall and the electrode, without having to undertake excessive deployment of metal, especially nickel.

Figure 4:
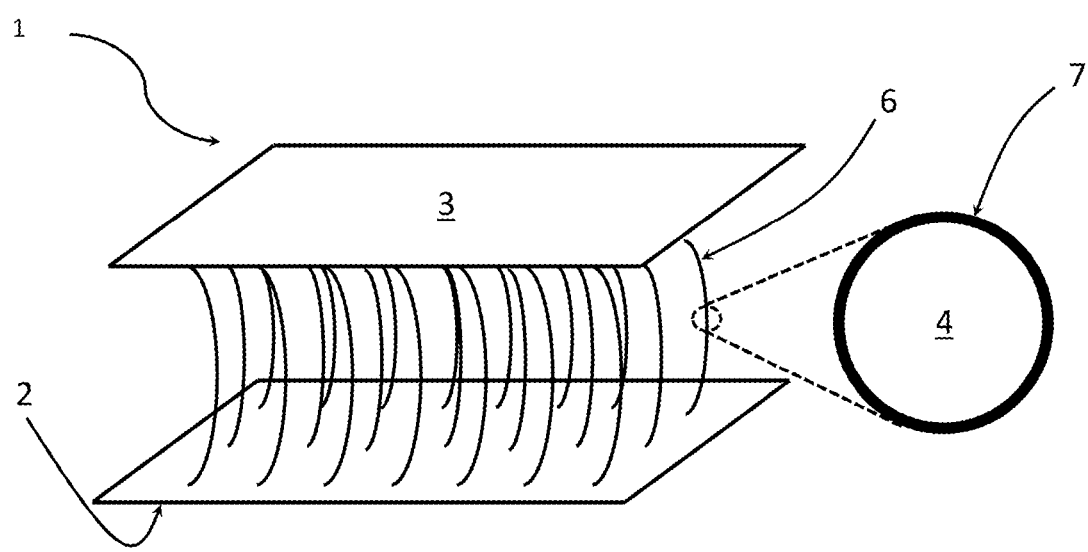
FIG. 4 is a schematic perspective side view of another example textile, including mechanical and (shown additionally in cross section) electrical connection means.

FIG. 4 shows a side view of the textile used in the invention according to an alternative embodiment, including showing the mechanical and electrical connection means. In this embodiment, the top and bottom fabrics 2, 3 of the mechanical connection means are connected to one another by coated pile threads 6, this connection being both mechanical and electrical. The mechanical connection of the top and bottom fabrics 2, 3 here is accomplished, as in the above-described preferred embodiment in FIGS. 1 to 3, by pile threads 4 composed of elastic polymeric filaments. The electrical connection of the top and bottom fabrics 2, 3 and hence of the adjacent rear housing wall and also electrode is realized—as illustrated by the cross-sectional representation of a coated pile thread 6—via an electrically conductive coating 7 of the pile threads 4. The coated pile threads 6 here may have been produced by coating of the pile threads 4 with an electrically conductive layer, preferably a metal, either before or after the weaving procedure.

Figure 5:
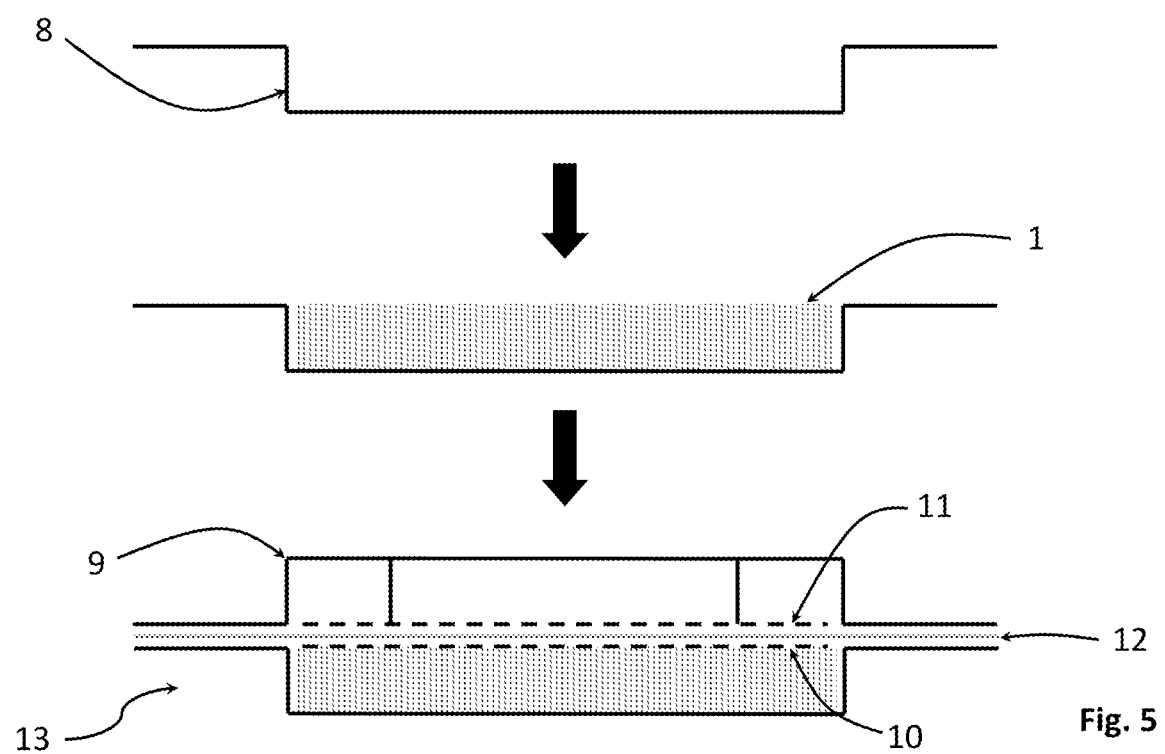
FIG. 5 is a schematic side view illustrating an example method for producing a zero-gap electrolytic cell.

A representation of the method of the invention for producing a zero-gap electrolytic cell of the invention is shown in FIG. 5 (from top to bottom). In a first step, at least one ply of a textile 1 is placed into an anode or cathode tank 8, 9—here the cathode tank 8, which is also referred to as the rear housing wall. Subsequently an anode or cathode electrode 10, 11—here the cathode electrode 10—is disposed on the at least one ply of the textile 1, before an ion exchange membrane 12 is placed onto this electrode. To complete the zero-gap electrolytic cell 13, lastly, a cathode or anode electrode 10, 11—here the anode electrode 11—connected to a cathode or anode tank 8, 9—here the anode tank 9—is disposed on the ion exchange membrane 12.

LIST OF REFERENCE SYMBOLS 1 textile
2 bottom fabric
3 top fabric
4 pile thread
5 metal wire
6 coated pile thread
7 electrically conductive coating
8 cathode tank
9 anode tank
10 cathode electrode
11 anode electrode
12 ion exchange membrane
13 zero-gap electrolytic cell
F force

What is claimed is:

1. A textile configured as a spacer between a housing or a supporting structure and an electrode or a substructure of the electrode of a zero-gap electrolytic cell, the textile comprising:
mechanical connection means composed of an elastic polymeric material, wherein the mechanical connection means has top and bottom fabrics made of filaments, with pile threads connecting the top and bottom fabrics; and
electrical connection means that is different than the mechanical connection means.

2. The process of claim 1 wherein the electrical connection means is configured as an electrically conductive coating of the pile threads.

3. The process of claim 1 wherein the electrical connection means comprises metal wires passing through the top and bottom fabrics.

4. The process of claim 3 wherein the metal wires have a diameter of 0.05 to 0.30 mm.

5. The process of claim 3 wherein the electrical connection means is configured as an electrically conductive coating of the pile threads, wherein the metal wires or the electrically conductive coating, respectively, are comprised of nickel or a nickel alloy.

6. The process of claim 1 wherein the filaments of the mechanical connection means have a diameter of 0.1 to 0.5 mm.

7. A zero-gap electrolytic cell comprising:
an anode electrode;
a cathode electrode;
an ion exchange membrane disposed between the anode electrode and the cathode electrode;
a housing comprised of an anode tank and a cathode tank; and
a ply of a textile disposed between and in contact with at least one of the electrodes and one of the tanks, the textile comprising:
mechanical connection means composed of an elastic polymeric material, wherein the mechanical connection means has top and bottom fabrics made of filaments, with pile threads connecting the top and bottom fabrics, and
electrical connection means that is different than the mechanical connection means.

8. The zero-gap electrolytic cell of claim 7 wherein the ply of the textile contacts the cathode electrode and the cathode tank.

9. A method for producing the zero-gap electrolytic cell of claim 7, comprising:
placing the ply of the textile into the anode tank or the cathode tank;
positioning the anode electrode or the cathode electrode on the ply of the textile;
placing the ion exchange membrane onto the anode electrode or the cathode electrode that is positioned on the ply of the textile;
placing the ion exchange membrane onto the electrode that is positioned on the ply of the textile; and
positioning the cathode electrode or the anode electrode connected to the cathode tank or the anode tank, respectively, on the ion exchange membrane.

10. The method of claim 9 comprising compressing the textile upon introducing the one of the electrodes and one of the tanks such that the textile lies against the respective electrode and the respective tank with a contact pressure resulting from an elasticity of the mechanical connection means.

11. The method of claim 10 wherein the contact pressure is 100 to 150 mbar.

* * * * *